Nov. 30, 1965  L. P. RODRIGUE  3,220,335
DEVICE FOR COOKING MEAT AND THE LIKE
Filed Nov. 2, 1962
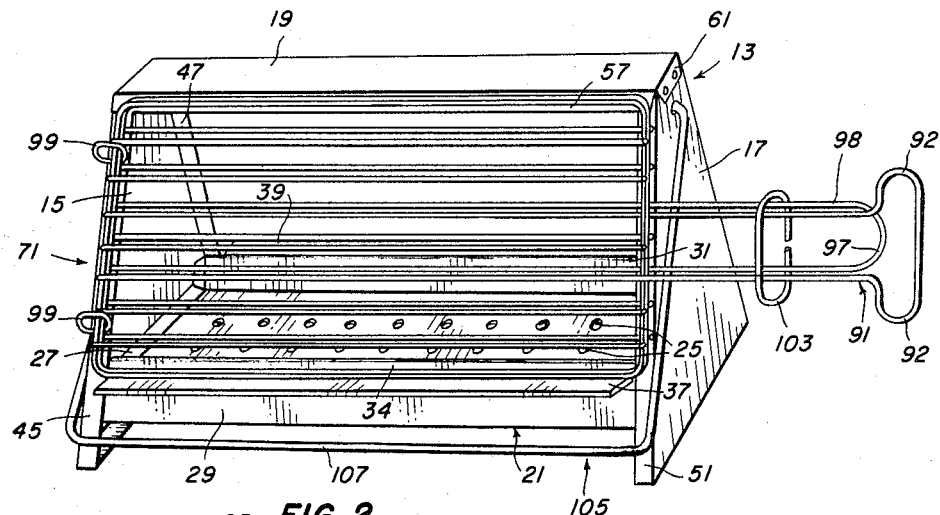
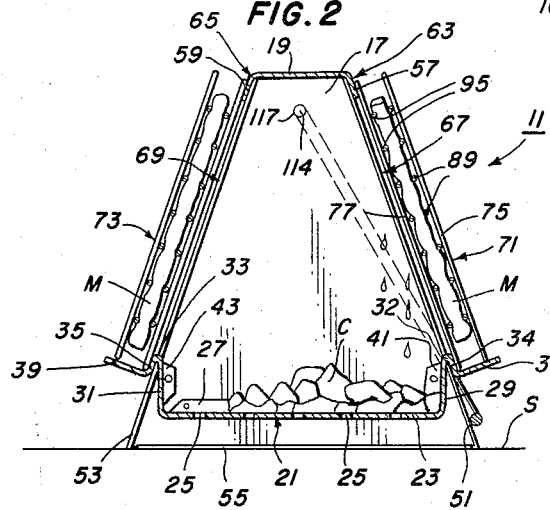
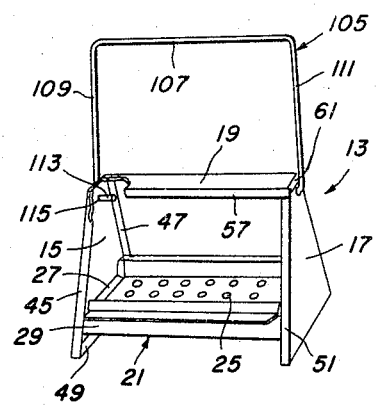
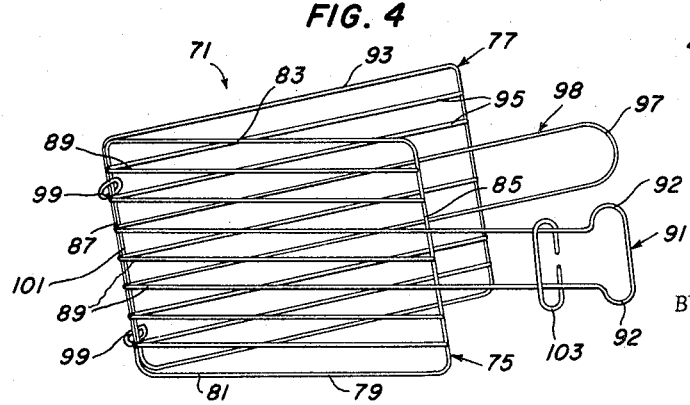
INVENTOR.
LLOYD P. RODRIGUE
BY John R. Walker, III
    Attorney United States Patent Office 3,220,335
Patented Nov. 30, 1965

3,220,335
DEVICE FOR COOKING MEAT AND
THE LIKE
Lloyd P. Rodrigue, 3839 Belleau Drive, Memphis 7, Tenn.
Filed Nov. 2, 1962, Ser. No. 235,095
4 Claims. (Cl. 99—394)

This invention relates to a device for cooking meat, such as steaks and the like, by the use of charcoal and the like. More particularly, the present invention relates to a portable grill.

One of the principal objects of the present invention is to provide a device for cooking meats in such a manner that surplus grease is eliminated therefrom and yet just enough of the grease is utilized to create a smokey substance that gives the meat the "charcoal smoke flavor."

A further object is to provide such a device that is simple in construction and economical to manufacture.

A further object is to provide such a device that is more efficient than other similar types of devices so that less charcoal is used and it is, therefore, less expensive to operate.

A further object is to provide such a device which is so constructed that the heat from the charcoal is baffled to a central area and onto the meat so that escape of the heat and smoke is substantially eliminated, which is vital to the charcoal flavor of the meat.

A further object is to provide such a device which is very convenient, handy and safe to use and which is so constructed that the handles of the racks extend away from the furnace unit and remain cool at all times.

A further object is to provide in such a device an elongated wire handle that is swingable to a resting place away from the heat of the furnace unit.

A further object is to provide in such a device a pair of grease troughs which serve the dual purpose of collecting all the excess unwanted grease drippings and disposing of same during the meat broiling process.

A further object is to provide such grease troughs which are so constructed that they serve as resting places for the meat racks.

A further object is to provide such meat racks into which can be conveniently and easily placed the meat to be cooked and which are of such a construction that the meat can be quickly, safely and easily turned.

A further object is to provide such a device which, among other things, is completely portable, compact, easy to store, and easy to carry about.

A further object is to provide such a device that, after use, cools quickly and can be cleaned easily.

A further object is to provide such a device which cooks cooler and which reduces the amount of smoke so that there are no smokey hot fumes to harass the chef.

A further object is to provide such a device in which it is virtually impossible for meats to burn and which does not need constant overseeing during the broiling process.

A further object is generally to improve the design and construction of devices for cooking meats.

The means by which the foregoing and other objects of the present invention are accomplished and the manner of their accomplishment will be readily understood from the following specification upon reference to the accompanying drawings, in which:

FIG. 1 is a perspective view of the device of the present invention showing one of the meat racks in place and with the device being empty of charcoal and meat.

FIG. 2 is a cross-sectional view taken as on a vertical plane through the device and showing both meat racks in place and with the device being in use to cook meat.

FIG. 3 is a perspective view on a reduced scale of the furnace unit and showing the handle in an upstanding position, and with a portion of the device being broken away for purposes of illustration.

FIG. 4 is a perspective view of one of the meat racks, shown in an open position.

Referring now to the drawings in which the various parts are indicated by numerals, the device 11 of the present invention comprises a furnace unit 13 that includes, in general, upstanding spaced end members 15, 17 which are interconnected by a top 19 adjacent the upper ends of the end members and by a firebox 21 spaced below top 19.

Referring now in more detail to furnace unit 13, it is preferably, though not necessarily, formed from four pieces of metal. One piece is disposed substantially horizontal and extends in spaced relationship above the lower edges of end members 15, 17 to establish the bottom 23 of firebox 21 and which is provided with a plurality of apertures 25 therethrough. Thus, it will be understood that when device 11 rests on a supporting surface with the lower edges of end members 15, 17 contacting the supporting surface, indicated as at S, the bottom 23 will be spaced above the supporting surface so that air can enter through apertures 25 and produce a draft on the burning fuel, as charcoal or the like, which is carried on bottom 23, as illustrated in FIG. 2 as at C. The piece of metal of which bottom 23 is a part is turned up adjacent the opposite ends thereof as at 27, which provides the means for attaching bottom 23 to the opposite end members 15, 17, as by spot welding the turned-up portions to the end members. Additionally, the piece of metal of which bottom 23 is a part is also turned up adjacent the opposite side edges thereof to establish side panels 29, 31 of firebox 21. Then, the metal is turned downwardly at the upper edges 32, 33 of side panels 29, 31 for portions as at 34, 35 and thence outwardly to establish troughs 37, 39 for a purpose later to be described. Additionally, the piece of metal heretofore described is preferably turned in as for portions 41, 43 from the opposite ends of side panels 29, 31 to provide the means for attaching the side panels 29, 31 to end members 15, 17, as by spot welding or the like.

For the primary purpose of structural strength, the side and lower edges of end members 15, 17 are preferably turned in at an angle substantially perpendicular to the main body portion of the end members. Thus, inturned side edges 45, 47 and lower edge 49 are provided on end member 15; and side edges 51, 53 and lower edge 55 are provided for end member 17. Also, the piece of metal that forms top 19 is preferably turned down adjacent the opposite side edges thereof as as 57, 59. In addition, the piece of metal that forms top 19 is turned down for portions adjacent the opposite ends thereof as at 61 to provide the means for attaching top 19 to end members 15, 17, as by spot welding or the like.

End members 15, 17 are preferably of the same size and similar in shape and each is preferably in the shape of an isosceles triangle having the apex thereof cut off so that the top of the figure is parallel and smaller than the base thereof. In other words, the shape is that of a trapezoid having two of its sides of the same length and inwardly disposed at the same angle. Thus, with the end members 15, 17 being of the shape above described, the opposite sides 63, 65 of furnace unit 13 extend upwardly and inwardly towards one another in converging relationship. The sides 63, 65 preferably, though not necessarily, form an angle of 70 degrees relative to the horizontal. It will be understood that side 63 is formed by downturned edge 57, side edges 45, 51, and downturned portion 34, which define an opening 67 in the side. In a similar manner, side 65 comprises downturned edge 59, side edges 47, 53, and downturned portion 35, which define an opening 69 in the side.

A pair of meat racks 71, 73 are provided, and the following description of meat rack 71 will suffice for both since the meat racks are substantially identical. Meat rack 71 is preferably formed of wire and comprises two mating grill halves 75, 77. Grill half 75 includes an open rectangular frame 79 formed of an elongated piece of wire and which includes spaced horizontal members 81, 83 that are integrally interconnected adjacent the opposite ends thereof as by spaced side members 85, 87. A plurality of horizontal spaced elongated intermediate members 89 are fixedly attached adjacent opposite ends thereof to side members 85, 87. A pair of the intermediate members 89 extend beyond side member 85 and are bent in the shape shown in FIGS. 1 and 4 to establish a handle portion 91 having ears 92 extending respectively upwardly and downwardly adjacent the distal end of the handle portion.

Grill half 77 is similar in construction to grill half 75 and includes a frame 93 and intermediate spaced horizontal members 95. A pair of the intermediate members 95 are extended in a similar manner to the extension of the pair of intermediate members 89 and are formed together adjacent the distal end in an arcuate portion 97 to establish a handle portion 98. A pair of oblong-shaped hinge members 99 are loosely provided around side member 87 and the corresponding side member 101 of grill half 77 so that the grill halves 75, 77 are movable from and to a clamping position adjacent one another, with the meat shown as at M therebetween, and open positions, for example, one of which is shown in FIG. 4, for reception of the meat. It will be understood that since the hinge members 99 are oblong, the grill halves 75, 77 can be spread apart somewhat to take care of the thickness of the meat when it is clamped therebetween. To hold the grill halves 75, 77 in said clamping position, a loop 103 of wire is loosely provided on handle portion 91 and retained thereon by ears 92. When the loop 103 is used to hold the grill halves 75, 77 together, it is slipped over handle portion 98, as shown in FIG. 1. When it is desired to open the grill halves 75, 77, it will be understood that loop 103 is moved down towards the end of handle portion 91 adjacent ears 92 so that the handle portion 98 can be removed therefrom.

The size of grill halves 75, 77 is such that the grill halves are substantially the same size as side 63 whereby the meat rack 71, when in place on furnace unit 13, rests on trough 37 and leans against side 63 at an angle, as seen in FIG. 2, with portions of the meat rack 71 being disposed over portions of the firebox 21. Thus, the meat M in meat rack 71 will be disposed over or overhang a portion of the burning charcoal C so that a part of the grease can drip therefrom into the fire to cause just enough smoke for giving the meat a charcoal flavor, and most of the grease will drip down onto trough 37 where it will run off the end thereof. It should be noted that when meat rack 71 is in place, as above described, handle portions 91, 98 will extend past the end of furnace unit 13 so that the handle will remain cool. Also, it should be noted that since only horizontally extending intermediate members 89, 95 are provided and no vertical members, more of the meat is exposed to the fire. Meat rack 73 is related in substantially the same manner to furnace unit 13 as meat rack 71 and rests on trough 39, as shown in FIG. 2.

A carrying handle 105 is provided for lifting furnace unit 13 and includes a horizontal portion 107 having leg portions 109, 111 extending perpendicular relative to horizontal portion 107 adjacent opposite ends thereof, and which leg portions are turned inwardly for a short portion as at 113, 114 where they respectively rotatably extend through apertures 115, 117 respectively provided in end members 15, 17. Thus, carrying handle 105 is movable between an at-rest position, as shown in FIGS. 1 and 2, wherein the horizontal portion 107 of the carrying handle is disposed below firebox 21 where it will remain cool and can be grasped to raise the handle, to an upstanding position, as shown in FIG. 3, whereby the device may be moved. Also, it will be understood that carrying handle 105 is useful for manipulating furnace unit 13 to dump the charcoal from the furnace unit. In addition, carrying handle 105 is resilient so that the leg portions 109, 111 can be sprung apart to remove the inturned portions 113, 114 from the apertures 115, 117 to remove the carrying handle from furnace unit 13, as for storing or if it is desired to keep the carrying handle even cooler during use of the device.

In using the device 11 of the present invention, the portions of meat M, as steaks, hamburgers, chops, chicken halves, ribs, or the like, are respectively placed in the meat racks 71, 73 as heretofore described, and the racks are placed upon the troughs 37, 39, also as heretofore described. It will be understood that the meat M will cook more economically since less charcoal C is necessary due to the fact that the heat is baffled downwardly by top 19 and inwardly by end members 15, 17. There is less smoke with the use of device 11 than with previous types of devices in which the meat is held horizontally over the fire, since there is less grease dripping on the fire when the present invention is used. Also, the smoke is substantially retained in the device since the meat M will substantially cover openings 67, 69. Additionally, the burning and flaming up of the fire is substantially eliminated with the device 11 of the present invention, which is a great advantage over previous types of charcoal devices in which it was necessary to keep the fire under control as by means of pouring water onto the charcoal. Furthermore, the device 11 is the present invention is particularly useful for people who have diabetes, gall bladder trouble, or ulcers of the stomach and who should not eat fatty, greasy meats, since the device of the present invention eliminates such fatty and greasy meats due to the fact that the majority of the grease drains off from the meat on troughs 37, 39. It will be understood that the meat will cook evenly due to the baffling arrangement heretofore described, since the lower portions of the meat will be adjacent charcoal C and the upper portions will be hot because of the downward baffling of the heat from top 19. After the meat has cooked on one side, the racks 71, 73 can be conveniently and easily turned over by gripping the handle portions 91, 98 and turning the racks 180 degrees. It will be understood that this ease of turning is effected by the fact that the handle portions 91, 98 are relatively wide so that they fit easily in the palm of the hand and can readily be gripped.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A self-contained device for cooking meat and the like with charcoal and the like comprising a furnace unit including an upwardly opening firebox for carrying charcoal and the like to produce a fire, said firebox having holes therethrough for producing a draft, said firebox including spaced upstanding side panels respectively having upper edges, a pair of depending portions respectively attached to said side panels adjacent said upper edges, a pair of substantially flat upstanding end members respectively attached to said firebox adjacent opposite ends thereof and extending thereabove for baffling the heat from the fire inwardly, said end members including inwardly and upwardly angled side edges, a top interconnecting said end members adjacent the upper ends thereof for baffling the heat from the fire downwardly, said top including depending side edges, and a pair of substantially horizontally extending troughs respectively attached to said depending portions; said side edges of said end members, said depending side edges of said top, and said depending portions establishing openings on opposite sides of said furnace unit inwardly sloping towards one another and extending partially over said firebox; a pair of racks for holding meat and the like respectively being supported at inwardly inclined angles on said troughs in resting relationship against said depending side edges, said angled side edges, and said depending portions and extending over said openings and with portions of said racks extending over said firebox whereby only a portion of the grease from the meat can drip on the fire and other portions can run onto said troughs.

2. The device of claim 1 in which each of said racks comprises a pair of grill halves each including horizontally extending spaced intermediate members extending for major portions thereof over said firebox and handle portions, hinge means attached to said grill halves to hingedly connect said grill halves for movement between a clamping position in which said grill halves are adjacent one another and open positions in which said grill halves are spread apart for the reception of meat and the like, a wire loop slidably received on one of said handle portions and movable over the other of said handle portions to hold said grill halves in said clamping position, said one of said handle portions being provided with ears limiting movement of said loop from said one of said handle portions.

3. The device of claim 2 in which said handle portions extend outwardly beyond said furnace unit for keeping said handle portions cool.

4. The device of claim 1 in which a carrying handle is provided comprising a horizontal portion, leg portions attached to said horizontal portion and extending substantially perpendicularly from opposite ends thereof, and short portions respectively attached to said leg portions and extending inwardly towards one another, said end members respectively being provided with apertures removably receiving said short portions, said carrying handle being movable between an upstanding carrying position relative to said furnace unit and an at-rest position disposed below said firebox, said leg portions being resilient whereby said leg portions can be spread apart to remove said carrying handle.

References Cited by the Examiner

UNITED STATES PATENTS

| | | | |
|---|---|---|---|
| 1,507,733 | 9/1924 | Harding | 99—400 |
| 2,177,177 | 10/1939 | Gough | 99—393 |
| 2,760,427 | 8/1956 | Alberhasky | 99—419 |
| 2,828,733 | 4/1958 | Moore. | |
| 3,096,707 | 7/1963 | Mills | 99—423 |

FOREIGN PATENTS 22,418    2/1896    Great Britain.

WALTER A. SCHEEL, *Primary Examiner.*

JEROME SCHNALL, ROBERT E. PULFREY,
*Examiners.*